United States Patent Office 3,454,585
Patented July 8, 1969

3,454,585
OCTAHYDROIMIDAZO[1,2-a]PYRIDIN-5-ONES
William J. Houlihan, Mountain Lakes, N.J., assignor to Sandoz Inc., Hanover, N.J.
No Drawing. Original application Mar. 31, 1965, Ser. No. 444,439, now Patent No. 3,334,099, dated Aug. 1, 1967. Divided and this application Apr. 13, 1967. Ser. No. 630,551
Int. Cl. C07d 57/14, 57/20; A61k 27/00
U.S. Cl. 260—294.7                         7 Claims

ABSTRACT OF THE DISCLOSURE

Compounds useful as sedatives belonging to the class having the basic structural formula

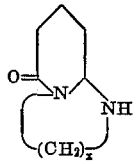

$n$ being an integer of from 2 to 3, inclusive.

---

This application is a division of S.N. 444,439, filed Mar. 31, 1965, now U.S. Patent 3,334,099 dated Aug. 1, 1967.

The instant invention is directed to compounds of the following formula:

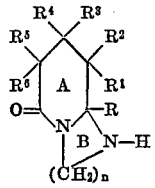

which compounds have the following subgenera dependent upon the value of $n$:

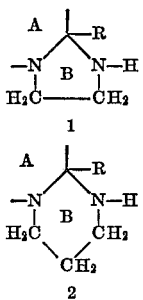

The following definitions are employed throughout the text:

R is either lower straight chain alkyl, e.g. methyl, ethyl, propyl and butyl; aryl, e.g. phenyl; ar(lower) alkyl, e.g. benzyl and phenethyl; or cycloalkyl having from 5 to 7 carbon atoms, e.g. cyclopentyl, cyclohexyl and cyclo- heptyl; aryl and the ar-of ar(lower)alkyl are of the formula

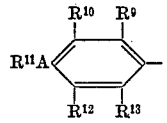

each of $R^1$, $R^2$, $R^3$, $R^4$, $R^5$, $R^6$, $R^7$, and $R^8$ is either a hydrogen atom (—H) or one of the following functional groups: lower straight chain alkyl, e.g. methyl, ethyl, propyl and butyl; aryl, e.g. parachlorophenyl; ar(lower)alkyl, e.g. 3,5-dimethylbenzyl; cycloalkyl having from 5 to 7 carbon atoms, e.g. cyclopentyl, cyclohexyl and cycloheptyl; and, together with its counterpart on the same ring carbon atom, polymethylene having from 4 to 6 carbon atoms, e.g. tetramethylene, pentamethylene and hexamethylene; with the proviso that (a) there are no more than three of said functional groups on two adjacent carbon atoms, (b) a plurality of cycloalkyl groups are not bound to adjacent carbon atoms, (c) a plurality of polymethylene groups are not bound to adjacent carbon atoms, and (d) there are a maximum of four of said functional groups on compounds Ib and Ic;

each of $R^9$, $R^{10}$, $R^{11}$, $R^{12}$, and $R^{13}$ is either a hydrogen atom (—H); a chlorine atom (—Cl); a fluorine atom (—F); a bromine atom (—Br); lower alkyl, preferably having from 1 to 4 carbon atoms, e.g. methyl, ethyl, propyl, isopropyl and butyl; lower alkoxy, preferably having from 1 to 4 carbon atoms, e.g. methoxy, ethoxy, propoxy, isopropoxy and butoxy; trifluoromethyl (—CF₃); lower alkylthio, preferably having from 1 to 4 carbon atoms, e.g. methylthio, ethylthio, propylthio, isopropylthio and butylthio; or, together with its counterpart on an adjacent ring carbon atom, methylenedioxy (—O—CH₂—O—)

with the proviso that (a) at least one of $R^9$, $R^{10}$, $R^{11}$, $R^{12}$ and $R^{13}$ is a hydrogen atom in each aryl and in each ar(lower)alkyl group, (b) a plurality of trifluoromethyl groups are not bound to adjacent carbon atoms, (c) each $R^9$ and $R^{13}$ of aryl and aralkyl groups is a hydrogen atom in a plurality of such groups bound to the same ring carbon atom, (d) each of $R^9$ of aryl and aralkyl groups is a hydrogen atom in a plurality of such groups bound to adjacent ring carbon atoms; and (e) each of $R^9$ and $R^{13}$ of aryl and aralkyl groups bound to the same ring carbon atom as a cycloalkyl group is a hydrogen atom;

$n$ is one of the integers 2, 3 and 4;
A is the azacycloalkanone ring of compounds I; and
B is the ring of compound I which contains two nitrogen atoms.

There are several methods of preparing compounds I. The reaction schemes for two of these methods are presented for the instance when each of $R^1$ to $R^8$ is a hydrogen atom. However, having any of the contemplated functional groups in embodied positions does not alter said methods.

TABLE 1

| R | R¹ | R² | R³ | R⁴ | R⁵ | R⁶ | n |
|---|---|---|---|---|---|---|---|
| —Me | —H | (chlorobenzodioxole) | —H | —H | (cyclopentyl) | —Et | 2 |
| (methylphenyl) | —Me | —Me,Me-benzodioxole | —H | —H | —Me | —Be | 2 |
| —Et | —H | —H | —Ph | —H | —H | —H | 3 |
| —CH₂—Pr | —Et | —(CH₂)₄— | —H | —H | —H | —(CH₂)₅— | 3 |
| (benzodioxole-CH₂) | —H | —H | —H | (cyclohexyl) | —H | —H | 4 |
| —Bu | —H | —H | —H | —(CH₂)₅— | —H | —H | 4 |
| (dibromochlorophenyl) | —H | —H | —Pr | —Me | —H | —H | 4 |
| —CH₂—CH₂— | —H | —H | (F,Cl-phenyl) | (CF₃,F,Br-phenyl) | —H | (OMe,Me,CF₃-phenyl) | 4 |
| —Ph | (OEt,Cl,Cl-phenyl) | —H | —Ph | —Me | —H | —(CH₂)₅— | 3 |
| (Cl,Et,F-phenyl) | —H | —H | —H | —Bu | (SMe,SEt-phenyl) | (OEt-phenyl) | 2 |
| —Be | —H | —H | —H | —Bu | — | — | 2 |

TABLE 1—Continued

| R | R¹ | R² | R³ | R⁴ | R⁵ | R⁶ | n |
|---|----|----|----|----|----|----|---|
| [Pr-, Br-, CH₂-O-O- substituted benzene] | —H | —H | —Me | —H | —H | —H | 2 |
| —CH₂—Be | —H | —H | —H | —H | —Et | —H | 2 |
| [3,5-(OMe)₂-benzyl] | —H | [cycloheptyl] | —H | —(CH₂)₄— | —Me | —H | 2 |
| [cyclopentyl] | —H | —Ph | —H | —Be | —H | —H | 4 |
| [CF₃, SEt, F-benzene] | —H | —H | [4-CF₃-benzyl] | —H | —H | —H | 4 |
| [cyclohexyl] | —H | —H | —H | —H | —Et | —H | 3 |
| [cycloheptyl] | [cyclohexyl] | —(CH₂)₆— | —H | —H | [cyclohexyl] | [2-CH₂-Cl,Br-benzene] | 3 |
| [cyclohexyl] | —H | —H | [methylenedioxy-SMe-benzene] | —Pe | —H | —H | 4 |
| —CH₂—CH₂—[benzodioxole] | —H | —H | —H | —H | —Et | —H | 3 |
| [SMe, CF₃-benzene] | —H | [cyclopentyl] | —H | —H | —H | —Me | 2 |

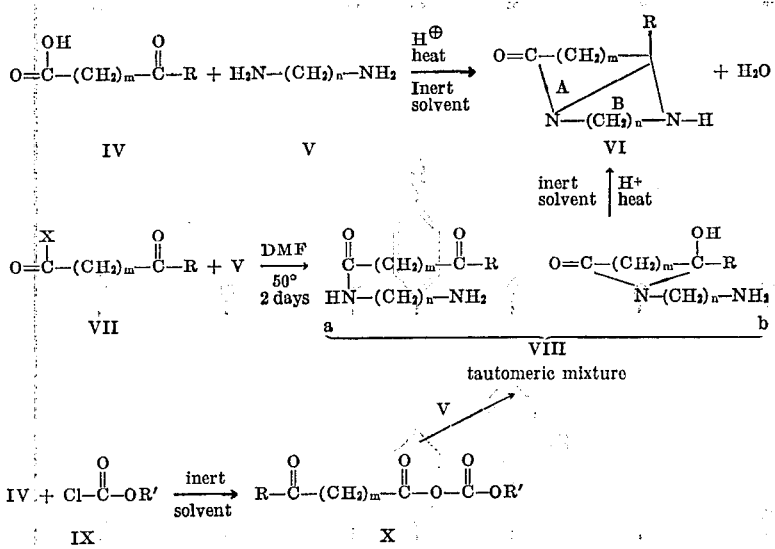

wherein
R' is lower alkyl (preferably having from 1 to 5 carbon atoms), e.g. methyl, ethyl, propyl, isopropyl, butyl and amyl;
m is 3; and
X is either a chlorine atom (—Cl) or a bromine atom (—Br).

The tautomeric mixture VIII is separated into its chemical individuals by known procedures, but such separation is not required to prepare compound VI, which is a particular subgroup of compounds I.

The reaction of IV with an alkyl chloroformate (alkyl chlorocarbonate) IX is effected in an inert solvent, e.g. toluene and diethylether, at a temperature from —10° to 100° C., preferably within the range of from —10° to 50° C. Stirring may be employed, but is not required.

For the noted reaction schemes only a catalytic amount of hydrogen ions is needed, as indicated. This is provided by a catalytic quantity of, e.g., para-toluenesulfonic acid. The inert solvent is any solvent, e.g. xylene, which is inert to both the reactants and the reaction products under the employed conditions. The heat that is indicated may vary, but reflux conditions are preferred.

The classes of compounds within the scope of this invention are:

1,2,3,5,6,7,8,8a-octahydro-imidazo[1,2-a]pyridin-5-ones;
1,2,3,4,7,8,9,9a-octahydro-6H-pyrido[1,2-a]pyrimidin-6-ones.

The compounds are exemplified in Table 1.
Exemplary compounds within the scope of this invention are illustrated by definition of the variables in Table 1.

In the table the following abbreviations are employed in addition to standard elemental symbols:

—Me: methyl
—Et: ethyl
—Pr: propyl
—Bu: butyl
—Ph: phenyl
—Be: benzyl

Each of the exemplary compounds is prepared in the above-described manner from corresponding starting materials and either IV or VII. These starting materials are either known or are prepared by known methods from available compounds.

Compounds I are CNS (central nervous system) active, e.g. depressants and sedatives, compounds and are useful as such. Some also are useful as anti-inflammatories. Compounds I are administered either orally or parenterally in daily doses of from 75 milligrams to 200 milligrams.

Each of the pharmaceutically active compounds of this invention may be, e.g., incorporated for oral administration in a tablet as the sole active ingredient. A typical tablet is constituted by from 1 to 3 percent binder, e.g. tragacanth; from 3 to 10 percent disintegrating agent, e.g. corn starch; from 2 to 10 percent lubricant, e.g. magnesium stearate; an average dose of active ingredient; and q.s. 100 percent of filler, e.g. lactose; all percentages being by weight. Tablets are prepared according to standard tabletting techniques, which are well-known in the art, employing the necessary amounts of conventional granulating liquids, e.g., alcohol SD-30 and purified water. An exemplary tabletting formulation for the instant active compounds is:

| | Parts |
|---|---|
| Title compound of Example 2 | 50 |
| Tragacanth | 2 |
| Lactose | 39.5 |
| Corn starch | 5 |
| Talcum | 3 |
| Magnesium stearate | 0.5 |
| Alcohol SD-30, q.s. | |
| Purified water, q.s. | |

In the examples which follow, the parts and percentages are by weight unless otherwise specified, and the temperatures are in degrees centigrade. The relationship between parts by weight and parts by volume is the same as that between the kilogram and the liter.

Example 1.—8a-phenyl-1,2,3,4,6,7,8,8a-octahydropyrrolo[1,2-a]pyrimidin-6-one

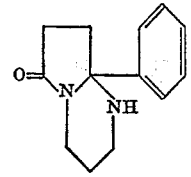

Charge a flask (equipped with a stirrer, heating mantle, condenser and a Dean-Stark tube) with 8.9 parts (0.05 mole) of 3-benzoylpropionic acid, 7.2 parts (0.1 mole) of 1,3-diaminopropane, 0.5 part of paratoluenesulfonic acid and 250 parts by volume of xylene. Stir and reflux until water ceases to separate in the Dean-Stark tube. Remove the solvent (xylene) on a rotary evaporator. Distill the resultant oil through a Claisen head to obtain an oil which solidifies on standing. Recrystallize the solid from isopropanol to obtain 4.1 parts of title compound, M.P. 132° to 132.5°.

Replacing the 3-benzoylpropionic acid with an equivalent amount of either 5-benzoylvaleric acid or 4-butyrylbutyric acid results in obtaining the corresponding compound I.

Example 2.—9a-phenyl-1,2,3,4,7,8,9,9a-octahydro-6H-pyrido[1,2-a]pyrimidin-6-one

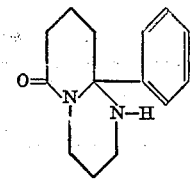

Charge a flask (equipped with a stirrer, heating mantle, condenser and a Dean-Stark tube) with 19.2 parts (0.10 mole) of 4-benzoylbutyric acid, 8.6 parts (0.12 mole) of 1,3-diaminopropane, 0.5 part of p-toluenesulfonic acid and 150 parts by volume of xylene. Stir and reflux the contents of the flask until water ceases to separate in the Dean-Stark tube. Remove the solvent on a rotary evaporator. Distill the resultant oil through a Claisen head to obtain an oil that solidifies on standing. Recrystallize the solid from ethyl acetate to obtain 2.4 parts of title compound, M.P. 140° to 141°.

Dissolve the oil in ethyl acetate. Admix the resulting solution with charcoal before removing the ethyl acetate in vacuo. There are thus obtained 2.4 parts of title compound, M.P. 140° to 141°.

Replacing the 4-benzoylbutric acid with an equivalent amount of either 3-acetylpropionic acid or 4-acetylbutyric acid results in obtaining the corresponding I. Likewise, replacing the 1,3-diaminopropane with an equivalent amount of 1,4-diaminobutane results in obtaining the corresponding compound I.

Example 3.—8a-methyl-8-phenyl-1,2,3,5,6,7,8,8a-octahydro-imidazo[1,2-a]pyridin-5-one

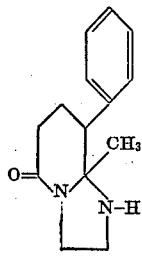

Charge a flask (equipped with a stirrer, heating mantle, condenser and a Dean-Stark tube) with 15.0 parts (0.075 mole) of 4-phenyl-5-oxohexanoic acid, 8.4 parts (0.14 mole) of 1,2-diaminoethane, 1 part of p-toluenesulfonic acid and 150 parts by volume of toluene. Stir and reflux the contents of the flask until water ceases to separate in the Dean-Stark tube. Remove the solvent on a rotary evaporator. Distill the resultant oil through a Claisen head to obtain an oil that solidifies on standing.

Dissolve the oil in methylene chloride/diethylether/pentane. Admix the resulting solution with charcoal before removing the solvent in vacuo. The title compound is thus obtained.

Replacing the 4-phenyl-5-oxohexanoic acid with an equivalent amount of 2-ethyl-2-phenyl-5-oxohexanoic acid results in the preparation, in similar manner, of 6-ethyl-6-phenyl - 8a - methyl-1,2,3,5,6,7,8,8a-octahydro-imidazo [1,2-a]pyridin-5-one.

Example 4. — 8-phenyl-8a-benzyl-1,2,3,5,6,7,8,8a-octahydro-imidazo[1,2-a]pyridin-5-one.

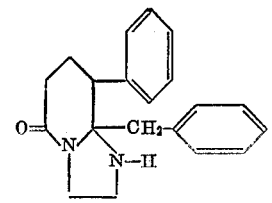

Charge a flask (equiped with a stirrer, heating mantle, condenser and a Dean-Stark tube) with 10.0 parts (0.035 mole) of 4,6-diphenyl-5-oxohexanoic acid, 4.44 parts (0.074 mole) of 1,2-diaminoethane, 0.5 part of p-toluenesulfonic acid and 150 parts by volume of toluene. Stir and reflux the contents of the flask until water ceases to separate in the Dean-Stark tube. Remove the solvent (toluene) on a rotary evaporator.

Dissolve the resultant oil in methylene chloride/heptane. Admix the resulting solution with charcoal before removing the solvent (methylene chloride/heptane) in vacuo. The title compound is thus obtained.

Replacing the 4,6-diphenyl-5-oxohexanoic acid with an equivalent amount of 4-ethyl-4-phenyl-5-oxohexanoic acid results in the preparation, in similar manner, of 8-ethyl-8-phenyl-8a - methyl-1,2,3,5,6,7,8,8a - octahydroimidazo [1,2-a]pyridin-5-one.

Example 5. — 8,8 - diphenyl - 8a-methyl-1,2,3,5,6,7,8,8a-octahydro-imidazo[1,2-a]pyridin-5-one.

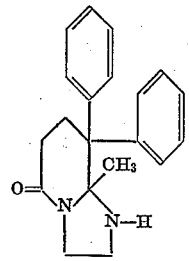

Charge a flask (equipped with a stirrer, heating mantle, condenser and a Dean-Stark tube) with 20.0 parts (0.071 mole) of 4,4-diphenyl-5-oxohexanoic acid, 8.4 parts (0.14 mole) of 1,2-diaminoethane, 1.0 part of p-toluenesulfonic acid and 200 parts by volume of toluene. Stir and reflux the contents of the flask until water ceases to separate in the Dean-Stark tube. Remove the solvent on a rotary evaporator.

Dissolve the resultant oil in methanol/water. Admix the resulting solution with charcoal before removing the methanol/water in vacuo. The title compound is thus obtained.

Example 6. — 8a - phenyl - 1,2,3,5,6,7,8,8a - octahydro-imidazo[1,2-a]pyridin-5-one.

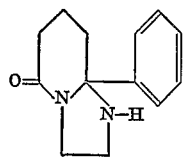

Charge a flask (equipped with a stirrer, heating mantle, condenser and a Dean-Stark tube) with 19.2 parts (0.1 mole) of γ-benzoylbutyric acid, 12.0 parts (0.2 mole) of 1,2-diaminoethan, 1 part of paratoluenesulfonic acid and 150 parts by volume of xylene. Stir and reflux the contents of the flask until water ceases to separate in the Dean-Stark tube. Remove the solvent on a rotary evaporator. Distill the resultant oil through a Claisen head to obtain an oil that solidifies on standing.

Dissolve the resultant oil in ethyl acetate. Admix the resulting solution with charcoal before removing the ethyl acetate in vauo. The title compound is thus obtained.

Example 7. — 10a-phenethyl-1,2,3,4,6,7,8,9,10,10a-decahydro-pyrimido[1,2-a]azepin-6-one.

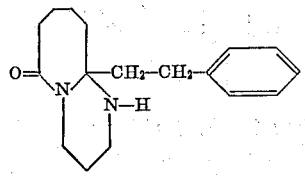

Charge a flask (equipped with a stirrer, heating mantle, condenser and a Dean-Stark tube) with 11.7 parts (0.05 mole) of 6-oxo-8-phenyloctanoic acid, 7.4 parts (0.10 mole) of 1,3-diaminopropane, 0.5 part of paratoluenesulfonic acid and 250 parts by volume of toluene. Stir and reflux the contents of the flask until water ceases to separate in the Dean-Stark tube. Remove the toluene on a rotary evaporator.

Dissolve the resultant oil in methanol/water. Admix the resulting solution with charcoal before removing the methanol/water in vacuo. The title compound is thus obtained.

Replacing the 6-oxo-8-phenyloctanoic acid with an equivalent amount of 2,3,4,5-tetramethyl-6-oxoheptanoic acid or an equivalent amount of 2,3-di-(p-chloropentyl)-5,5-hexamethylene-7-oxoheptanoic acid results in the preparation, in similar manner, of the corresponding compound I. Replacing the 6-oxo-8-phenyloctanoic acid with an equivalent amount of 2-ethyl-2-phenyl-5-oxohexanoic acid results in the preparation, in similar manner, of 7-ethyl-7-phenyl-9a - methyl - 1,2,3,4,7,8,9,9a-octahydro-6H-pyrido-[1,2-a]pyrimidin-6-one. Likewise, replacing the 6-oxo-8-phenyl-octanoic acid with an equivalent amount of 4-ethyl-4-phenyl-5-oxohexanoic acid results in the preparation, in similar manner, of 9-ethyl-9-phenyl-9a-methyl-1,2,3,4,7,8,9,9a-octahydro-6H - pyrido[1,2-a]pyrimidin-6-one.

Example 8. — 7a-phenyl-2,3,5,6,7,7a-hexahydro-1H-pyrrolo[1,2-a]imidazol-5-one.

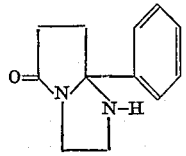

Charge a flask (equipped with a stirrer, heating mantle, condenser and a Dean-Stark tube) with 17.8 parts (0.1 mole) of 3-benzoylpropionic acid, 12.0 parts (0.2 mole) of ethylenediamine, 1.0 part of para-toluenesulfonic acid and 500 parts by volume of toluene. Stir and reflux until water ceases to separate in the Dean-Stark tube. Remove the solvent (toluene) on a rotary evaporator. Distill the resultant oil through a Claisen head to obtain an oil which solidifies on standing. Recrystallize the solid from isopropanol to obtain 2.9 parts of title compound, M.P. 129° to 130°.

Replacing the 3-benzoylpropionic acid with an equivalent amount of either 5-benzoylvaleric acid or 4-butyryl butyric acid results in obtaining the corresponding compound I.

Various changes may be made in the structures of compound I without departing from the spirit and scope of the invention or sacrificing its material advantages. The enumerated exemplary compounds and the working examples merely provide illustrative embodiments.

What is claimed is:

1. A compound of the formula

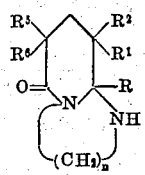

wherein
R represents straight chain(lower)alkyl, phenyl or benzyl;
each of $R^1$, $R^2$, $R^5$ and $R^6$ is hydrogen, straight chain (lower) alkyl or phenyl;
and
n represents 2.

2. 8a-methyl - 8 - phenyl-1,2,3,5,6,7,8,8a - octahydroimidazo[1,2-a]pyridin-5-one.

3. 6-ethyl-6-phenyl-8a-methyl - 1,2,3,5,6,7,8,8a-octahydroimidazo[1,2-a]pyridin-5-one.

4. 8 - phenyl - 8a - benzyl - 1,2,3,5,6,7,8,8a-octahydroimidazo[1,2-a]pyridin-5-one.

5. 8-ethyl-8-phenyl-8a-methyl - 1,2,3,5,6,7,8,8a-octahydroimidazo[1,2-a]pyridin-5-one.

6. 8,8-diphenyl-8a-methyl - 1,2,3,5,6,7,8,8a-octahydroimidazo[1,2-a]pyridin-5-one.

7. 8a - phenyl - 1,2,3,5,6,7,8,8a - octahydro - imidazo [1,2-a]pyridin-5-one.

References Cited

C. A. 64, 6664gh–6665ah (1966).

ALEX MAZEL, Primary Examiner.

R. V. RUSH, Assistant Examiner.

U.S. Cl. X.R.

424—251

Disclaimer 3,454,585.—*William J. Houlihan*, Mountain Lakes, N. J. OCTAHYDRO-IMIDAZO[1,2-a]PYRIDIN-5-ONES. Patent dated July 8, 1969. Disclaimer filed Nov. 13, 1970, by the assignee, *Sandoz-Wander, Inc.;* the inventor consenting.

Hereby enter this disclaimer to claims 1 and 7 of said patent.

[*Official Gazette December 15, 1970.*]